(12) United States Patent
Schellenberg

(10) Patent No.: US 6,867,276 B2
(45) Date of Patent: Mar. 15, 2005

(54) VINYLAROMATIC POLYMERS HAVING HIGH MELT FLOW

(75) Inventor: Jürgen Schellenberg, Halle (DE)

(73) Assignee: Dow Global Technologies Inv., Midland, MI (US)

( * ) Notice: Subject to any disclaimer, the term of this patent is extended or adjusted under 35 U.S.C. 154(b) by 0 days.

(21) Appl. No.: 10/498,735

(22) PCT Filed: Dec. 18, 2002

(86) PCT No.: PCT/US02/40832

§ 371 (c)(1),
(2), (4) Date: Jun. 15, 2004

(87) PCT Pub. No.: WO03/062285

PCT Pub. Date: Jul. 31, 2003

(65) Prior Publication Data

US 2005/0010005 A1 Jan. 13, 2005

Related U.S. Application Data

(60) Provisional application No. 60/350,400, filed on Jan. 22, 2002.

(51) Int. Cl.⁷ .................................. C08F 12/04
(52) U.S. Cl. ...................... 526/346; 526/153; 526/160; 526/170; 526/905
(58) Field of Search ................ 526/905, 153, 526/160, 170, 346

(56) References Cited

U.S. PATENT DOCUMENTS

| | | | |
|---|---|---|---|
| 4,990,580 A | 2/1991 | Ishihara et al. | 405/83 |
| 5,037,907 A | 8/1991 | Imabayashi et al. | 402/349 |
| 5,064,802 A | 11/1991 | Stevens et al. | 547/728 |
| 5,153,157 A | 10/1992 | Hlatky et al. | 496/378 |
| 5,254,647 A | 10/1993 | Yamamoto et al. | 707/183 |
| 5,296,433 A | 3/1994 | Siedle et al. | 868/41 |
| 5,451,648 A * | 9/1995 | Ikeuchi et al. | 526/153 |
| 5,468,818 A | 11/1995 | Newman et al. | 402/446 |
| 5,824,753 A | 10/1998 | Naganuma et al. | 750/844 |

FOREIGN PATENT DOCUMENTS

| | | | | |
|---|---|---|---|---|
| EP | 277003 | 8/1988 | | C08F/4/64 |
| EP | 468651 | 1/1992 | | C08F/4/74 |
| EP | 520732 | 12/1995 | | C08F/10/00 |
| WO | WO 93/03250 | 2/1993 | | E06B/9/30 |

OTHER PUBLICATIONS

J. Am. Chem. Soc. 107, 5016 (1985).
J. Am. Chem. Soc. 104, 373 (1982).
J. Chem. Soc. Chem. Comm 383–384 (1994).
Angew. Chem., Intr. Ed. Engl. 27, 1099 (1988).
Lambert, J. B. et al., Organometallics, 13, 2430–2443 (1994).

* cited by examiner

Primary Examiner—Fred Teskin

(57) ABSTRACT

A process for preparing syndiotactic polymers of vinylaromatic monomers having improved melt flowability comprising contacting one or more vinylaromatic monomers with a catalyst system comprising a titanium coordination complex capable of preparing syndiotactic vinylaromatic polymers under addition polymerization conditions in the presence of hydrogen gas at a hydrogen partial pressure from 0.1 to less than 10 kPa.

6 Claims, No Drawings

VINYLAROMATIC POLYMERS HAVING HIGH MELT FLOW

CROSS REFERENCE STATEMENT

This application claims the benefit of U.S. Provisional Application No. 60/350,400, filed Jan. 22, 2002.

BACKGROUND OF THE INVENTION

The present invention relates to syndiotactic vinylaromatic homopolymers and copolymers having a high melt flow and a method for the manufacture thereof. It is previously known in the art to prepare vinylaromatic polymers having a high degree of syndiotacticity.

In U.S. Pat. No. 5,037,907 and U.S. Pat. No. 5,254,647 suitable reactor designs, catalysts and processing conditions for preparing syndiotactic vinylaromatic polymers are taught. In U.S. Pat. No. 4,990,580, the use of hydrogen at a partial pressure within the range of 0.01 to 50 kg/cm$^2$ (1 to 5000 kPa) in order to control the molecular weight of the resulting syndiotactic vinylaromatic polymer product was taught. In U.S. Pat. No. 5,824,753, syndiotactic polymers of vinylaromatic monomers were prepared by contacting one or more vinylaromatic monomers and one or more catalyst compositions comprising a titanium based metal complex, a trialkylaluminum compound and hydrogen in a partial pressure up to 5 MPa, suitably 50 to 100 kPa In U.S. Pat. No. 5,468,818, improved catalyst efficiency is obtained in a polymerization process for preparing syndiotactic polymers of vinylaromatic monomers comprising contacting one or more vinylaromatic monomers and one or more catalyst compositions comprising a pentamethylcyclopentadienyltitanium based metal complex capable of preparing syndiotactic vinylaromatic polymers, a trialkylaluminum compound and a hydrogen partial pressure from 10 to 45 kPa. was disclosed.

SUMMARY OF THE INVENTION

According to the present invention it has now been discovered that the use of ultra low hydrogen partial pressures during the polymerization of vinylaromatic monomers to form syndiotactic polymers thereof using titanium coordination complex containing catalysts gives a syndiotactic polymer having high melt flow while maintaining a desirable molecular weight distribution, preferably in the range from 2.0 to 10.0, more preferably from 2.5 to 5.0. More specifically there is provided a process for preparing syndiotactic polymers of vinylaromatic monomers comprising contacting one or more vinylaromatic monomers and one or more catalyst compositions comprising a titanium coordination complex capable of preparing syndiotactic vinylaromatic polymers under addition polymerization conditions characterized in that the polymerization is conducted in the presence of hydrogen gas at a hydrogen partial pressure from 0.1 to less than 10 kPa, preferably 0.1 to less than 1.0 kPa, most preferably from 0.15 to 0.9 kPa, and at a molar ratio based on Ti, that is, H$_2$:Ti, from 10–500, preferably from 10 to 150. At higher H$_2$ partial pressures, flowability of the polymer is not dramatically improved and physical properties of the polymer, especially tensile modulus may be adversely affected.

DETAILED DESCRIPTION OF THE INVENTION

All reference to the Periodic Table of the Elements herein shall refer to the Periodic Table of the Elements, published and copyrighted by CRC Press, Inc., 2001. Also, any reference to a Group or Groups shall be to the Group or Groups as reflected in this Periodic Table of the Elements using the IUPAC system for numbering Groups.

The contents of any patent, patent application or publication referenced herein are hereby incorporated by reference in their entirety herein, especially with respect to the disclosure of organometallic structures, synthetic techniques and general knowledge in the art. The term "comprising" and derivatives thereof, when used herein with respect to a composition, mixture, or sequence of steps, is not intended to exclude the additional presence of any other compound, component or event.

The term "polymer" as used herein refers to a polymeric compound prepared by polymerizing monomers alone or in combination. The generic term polymer thus embraces the term "homopolymer", employed to refer to polymers prepared from only one monomer, and the terms "interpolymer" which refers to polymers prepared by the polymerization of at least two different monomers and "copolymer" which refers to polymers prepared from two different monomers.

The term "flowability" refers to the relationship between the melt viscosity of the polymer under varying shear rates at a given temperature. Highly desired are polymers that maintain a relatively high flow rate under high shear. Such polymers may be molded using less mold pressure than comparative polymers or alternatively give reduced mold cycle times under equivalent molding conditions. Flowability is a measure of the dependence of the viscosity of the polymer melt ($\eta^*$) on the frequency ($\omega$) of a rotating plate immersed therein using a rotary rheometer. Such measurements are performed under nitrogen atmosphere at 290° C. "Reduced viscosity" ($\eta^*/\eta_0$) is the ratio of the viscosity of the polymer melt to the viscosity of the polymer melt at zero shear rate, $\eta_0$. "Flowability improvement" is defined for use herein as the percentage improvement in a polymer's flowability compared to a polymer produced using no hydrogen during the polymerization, but otherwise using equivalent polymerization conditions. Desirably, the polymer has a flowability improvement measured at a frequency of 50 radians/s of at least 4.0 percent, more preferably at least 7.5 percent.

Suitable vinylaromatic polymers prepared according to the present invention include homopolymers or interpolymers of a vinylaromatic monomer represented by the formula: ArCH=CH$_2$, wherein Ar is phenyl or a phenyl group substituted with from 1 to 5 radicals selected from the group consisting of halo, alkyl, and haloalkyl. Exemplary vinylaromatic monomers include styrene, vinyl toluene, t-butyl styrene, chlorostyrene and bromostyrene (with respect to substituted styrene monomers, all isomers individually or in admixture are included). Preferred syndiotactic vinylaromatic polymers include syndiotactic polystyrene and syndiotactic copolymers of styrene and p-vinyltoluene containing up to 25 percent vinyltoluene by weight.

Preferred syndiotactic polymers are such polymers having a degree of syndiotacticity as measured by a racemic triad of the $^{13}$C NMR spectrum of at least 75 percent, and most preferably at least 90 percent.

The resulting syndiotactic vinylaromatic polymer preferably has a weight-average molecular weight of 10,000 to 2,000,000, more preferably from 20,000 to 1,000,000 with a number-average molecular weight of 5,000 to 1,000,000, more preferably 5,000 to 500,000. The syndiotactic vinylaromatic polymer preferably has a crystalline melting point from 230 to 270° C., more preferably from 245 to 270° C.

Suitable catalyst compositions employed in the present polymerization process include titanium based metal complexes containing a single π-bonded ligand group that is active in the polymerization of vinylaromatic monomers to form polymers of high syndiotacticity. Generally such catalyst compositions comprise such a metal complex and one or more activating cocatalysts.

More particularly such catalyst compositions comprise:

1) at least one titanium coordination complex corresponding to the formula: $CpTiX_nX'_q$ wherein:

Cp is an aromatic polyatomic group coordinated to Ti by means of delocalized π-electrons, preferably a cyclopentadienyl or a hydrocarbyl-substituted cyclopentadienyl group, more preferably pentamethylcyclopentadienyl, indenyl or octahydrofluorenyl;

X independently each occurrence is a monovalent anionic moiety having up to 20 atoms not counting hydrogen; alternatively, two X groups together may form a divalent, dianionic moiety having both valences bound to Ti, or form a neutral diene bonded to Ti by delocalization of the diene bonds; or further alternatively, one or more X groups may be bonded to one or more X' groups thereby forming a moiety that is both covalently bonded to M and coordinated thereto by means of Lewis base functionality;

X' independently each occurrence is a neutral Lewis base ligating compound having up to 20 atoms not counting hydrogen;

n is an integer from 1 to 3 equal to one less than the oxidation state of Ti, preferably 3; and q is 0, 1 or 2, preferably 0; and 2) an activating cocatalyst, the molar ratio of 1) to 2) being from 1:10,000 to 100:1.

The metal complexes used in the present invention may be formed by reacting a metal precursor compound lacking the coordinated aromatic polyatomic group and containing one or two leaving groups, with Group 1 or 2 metalated derivative of the aromatic polyatomic group. Suitable leaving groups include halide, hydrocarbyloxy, siloxy, sulfonate and carboxylate leaving groups. The procedure is analogous to those disclosed in *J. Am. Chem. Soc.* 107, 5016 (1985) or *Angew. Chem., Intr. Ed. Engl.*, 27, 1099 (1988) and *J. Am. Chem. Soc.*, 104, 3737 (1982). Optionally, one or more neutral ligating compounds such as phosphines, phosphites, amines, carbon monoxide, or ethers may be present during the reaction or may be added later. The reaction is conducted in a suitable noninterfering solvent at a temperature from −100° C., to 300 C., preferably from −78 to 100° C., most preferably from 0 to 80° C. Suitable reaction media for the formation of the complexes are aliphatic and aromatic hydrocarbons and halohydrocarbons, ethers, and cyclic ethers. Examples include straight and branched-chain hydrocarbons such as isobutane, butane, pentane, hexane, heptane, octane, and mixtures thereof, cyclic and alicyclic hydrocarbons such as cyclohexane, cycloheptane, methylcyclohexane, methylcycloheptane, and mixtures thereof; aromatic and hydrocarbyl-substituted aromatic compounds such as benzene, toluene, xylene, styrene and the like, $C_{1-4}$ dialkyl ethers, $C_{1-4}$ dialkyl ether derivatives of (poly)alkylene glycols, and tetrahydrofuran. Mixtures of the foregoing are also suitable.

The recovery procedure involves separation of the resulting alkali metal or alkaline earth metal salt and devolatilization of the reaction medium. Extraction into a secondary solvent may be employed if desired. Alternatively, if the desired product is an insoluble precipitate, filtration or other separation technique may be employed.

Suitable X groups include: halide (fluoride, chloride, bromide and iodide, especially chloride), hydrocarbyl, hydrocarbyloxy, di(hydrocarbyl)amido, di(hydrocarbyl) phosphido, hydrocarbylsulfido, and silyl groups, as well as halo-, di(hydrocarbyl)amino-, hydrocarbyloxy- and di(hydrocarbyl)phosphino-substituted derivatives thereof, said X group having up to 20 nonhydrogen atoms. Preferred X groups are chloride, OR, and $NR_2$, where R independently each occurrence is a hydrocarbyl or silyl group of up to 10 nonhydrogen atoms. Especially suited X groups are methoxy, phenoxy, isopropoxy, and dimethylamido.

Preferred X' groups are phosphines, especially trimethylphosphine, triethylphosphine, triphenylphosphine, trifluorophosphine and bis(1,2-dimethylphosphino)ethane; phosphites, especially trimethyl phosphite, triethyl phosphite, and dimethylphenyl phosphite; ethers, especially tetrahydrofuran; amines, especially pyridine, bipyridine, tetramethylethylenediamine (TMEDA), and triethylamine; and carbon monoxide.

A most preferred coordination complex for use according to the present invention is octahydrofluroenyltitaniumtrimethoxide.

The titanium complexes are rendered catalytically active by combination with an activating cocatalyst. Suitable activating cocatalysts for use herein include polymeric or oligomeric alumoxanes, especially methylalumoxane, triisobutyl aluminum modified methylalumoxane, or diisobutylalumoxane; strong Lewis acids, such as, $C_{1-30}$ hydrocarbyl substituted Group 13 compounds, especially tri(hydrocarbyl)aluminum- or tri(hydrocarbyl)boron- compounds and halogenated derivatives thereof, having from 1 to 10 carbons in each hydrocarbyl or halogenated hydrocarbyl group, especially tris(pentafluorophenyl)borane; and nonpolymeric, inert, compatible, noncoordinating, ion forming compounds (including the use of such compounds under oxidizing conditions). Combinations of the foregoing activating cocatalysts and techniques may also be employed if desired. The foregoing activating cocatalysts have been previously taught with respect to different metal complexes in the following references: EP-A-277,003, U.S. Pat. No. 5,153,157, U.S. Pat. No. 5,064,802, EP-A-468,651, EP-A-520,732, and WO93/03250.

Suitable nonpolymeric, inert, compatible, noncoordinating, ion forming compounds useful as cocatalysts in one embodiment of the present invention comprise a cation which is a Bronsted acid capable of donating a proton, and an inert, compatible, noncoordinating, anion, $A^-$. Preferred anions are those containing a single coordination complex comprising a charge-bearing metal or metalloid core which anion is capable of balancing the charge of the active catalyst species (the metal cation) which is formed when the two components are combined. Also, said anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

Preferably such cocatalysts may be represented by the following general formula:

$(L^*-H)^+_f(A^{f-})$, wherein:

$L^*$ is a neutral Lewis base;

(L*–H)+ is a Bronsted acid;

A$^{f-}$ is a noncoordinating, compatible anion having a charge of f–, and f is an integer from 1 to 3.

More preferably f is one, that is A$^{f-}$ is A$^-$. Highly preferably, A$^-$ corresponds to the formula: [BQ$_4$]$^-$ wherein:

B is boron in the +3 formal oxidation state; and

Q independently each occurrence is selected from hydride, dialkylamido, halide, alkoxide, aryloxide, hydrocarbyl, and halosubstituted-hydrocarbyl radicals, said Q having up to 20 carbons with the proviso that in not more than one occurrence is Q halide.

In a most preferred embodiment, Q is a fluorinated $C_{1-20}$ hydrocarbyl group, most highly preferably, a fluorinated aryl group, especially, pentafluorophenyl.

Illustrative, but not limiting, examples of ion forming compounds comprising proton donatable cations which may be used as activating cocatalysts in the preparation of the catalysts of this invention are tri-substituted ammonium salts such as: trimethylammonium tetraphenylborate,
triethylamnmonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl(2,4,6-trimethylanilinium) tetraphenylborate,
 trimethylammonium tetrakis(penta-fluorophenyl)borate,
triethylammonium tetrakis(pentafluorophenyl)borate,
 tripropylammonium tetrakis(pentafluoro-phenyl)borate,
tri(n-butyl)ammonium tetrakis(pentafluorophenyl)borate, tri
 (sec-butyl)ammonium tetrakis(pentafluorophenyl)borate,
N,N-dimethylanilinium tetrakispentafluorophenyl)borate,
N,N-diethylanilinium tetrakis(pentafluorophenyl)borate,
 N,N-dimethyl(2,4,6-trimethylanilinium) tetrakis (pentafluorophenyl)borate,
trimethylammonium tetrakis(2,3,4,6-tetrafluorophenylborate,
triethylammonium tetrakis(2,3,4,6-tetrafluorophenyl)borate,
tripropylammonium tetrakis(2,3,4,6-tetrafluorophenyl) borate,
tri(n-butyl)ammonium tetrakis(2,3,4,6-tetrafluorophenyl) borate,
dimethyl(t-butyl)ammonium tetrakis(2,3,4,6-tetrafluorophenyl)borate,
N,N-dimethylanilinium tetrakis(2,3,4,6-tetrafluorophenyl) borate,
N,N-diethylanilinium tetrakis(2,3,4,6-tetrafluorophenyl) borate, and
N,N dimethyl-(2,4,6-trimethylanilinium) tetrakis(2,3,4,6-tetrafluorophenyl)borate;
dialkyl ammonium salts such as:
di-(i-propyl)ammonium tetrakis(pentafluorophenyl)borate, and
dicyclohexylammonium tetrakis(pentafluorophenyl)borate;
and tri-substituted phosphonium salts such as:
triphenylphosphonium tetrakis(pentafluorophenyl)borate,
tri(o-tolyl)phosphonium tetrakis(pentafluorophenyl)borate, and
tri(2,6-dimethylphenyl)phosphonium tetrakis (pentafluorophenyl)borate.

Preferred are N,N-dimethylanilinium tetrakis (pentafluorophenyl)borate and tributylammonium tetrakis (pentafluorophenyl)borate.

Another suitable nonpolymeric, inert, compatible, noncoordinating, ion forming, activating cocatalyst comprises a salt of a cationic oxidizing agent and a noncoordinating, compatible anion represented by the formula: $(Ox^{e+})_d(A^{f-})_e$ wherein:

$Ox^{e+}$ is a cationic oxidizing agent having a charge of e+;

e is an integer from 1 to 3; and

A$^{f-}$, and f are as previously defined.

Examples of cationic oxidizing agents include: ferrocenium, hydrocarbyl-substituted ferrocenium, Ag$^+$, or Pb$^{+2}$. Preferred embodiments of A$^{f-}$ are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion and a noncoordinating, compatible anion represented by the formula: Cb$^+$A$^-$, wherein: Cb$^+$ is a $C_{1-20}$ carbenium ion; and A$^-$ is as previously defined. A preferred carbenium ion is the trityl cation, that is triphenylcarbenium.

A further suitable ion forming, activating cocatalyst comprises a compound which is a salt of a silylium ion and a noncoordinating, compatible anion represented by the formula: $R^1{}_3Si(X')_h{}^+A^-$, wherein:

$R^1$ is $C_{1-10}$ hydrocarbyl, h is a number from 0 to 3, and

X' and A$^-$ are as previously defined.

Preferred silylium salt activating cocatalysts are trimethylsilylium tetrakispentafluorophenylborate, triethylsilylium tetrakispentafluorophenylborate and ether substituted adducts thereof. Silylium salts have been previously generically disclosed in *J. Chem Soc. Chem.Comm.*, 1993, 383–384, as well as Lambert, J. B., et al., *Organometallics*, 1994, 13, 2430–2443.

Certain complexes of alcohols, mercaptans, silanols, and oximes with tris(pentafluorophenyl)borane are also effective catalyst activators and may be used according to the present invention. Such cocatalysts are disclosed in U.S. Pat. No. 5,296,433.

The foregoing activating cocatalysts are also preferably used in combination with a tri(hydrocarbyl)aluminum compound having from 1 to 4 carbons in each hydrocarbyl group, an oligomeric or polymeric alumoxane compound, or a mixture of a tri(hydrocarbyl)aluminum compound having from 1 to 4 carbons in each hydrocarbyl group and a polymeric or oligomeric alumoxane.

An especially preferred activating cocatalyst comprises the combination of a trialkyl aluminum compound having from 1 to 4 carbons in each alkyl group and an alumoxane, especially methylalumoxane or triisobutylaluminum modified methylalumoxane, in a molar ratio from 0.1:1 to 1:0.1, employed in an amount to provide a molar ratio of alumoxane:Ti of from 10:1 to 100:1.

The polymerization is conducted at temperatures from 25–90° C. and pressures from atmospheric to 50 psig (100–450 kPa). A support for the catalyst, especially silica, alumina, or a polymer (especially polytetrafluoroethylene or a syndiotactic polyvinylaromatic compound) may be employed, if desired. Generally however, the catalyst composition is added to a powder bed reactor operating at relatively high solids level (70–90 percent solids) in the form of a solution in an organic liquid. In most polymerization reactions the molar ratio of catalyst:vinylaromatic monomer is from $10^{-12}$:1 to $10^{-1}$:1, more preferably from $10^{-12}$:1 to $10^{-5}$:1.

Suitable diluents for use in the polymerization are inert liquids especially aromatic compounds such as benzene, toluene, ethylbenzene, xylene and the like. Additional diluents that may be used to cool the reaction through the latent heat of vaporization, especially low boiling aliphatic compounds such as butane, pentane, isopentane, and hexane may also be present if desired. Finally, gaseous, inert diluents, especially nitrogen, argon or helium may be present in the reaction mixture to assist in preventing oxygen entry to the reactor. Preferably a pressure from 0.1 to 100 psig (100 to 700 kPa) is desirable inside the reactor to retain the reaction mixture under inert reaction conditions. It is believed, without wishing to be bound by such belief, that in a preferred embodiment of the invention, the polymerization occurs on the surfaces of polymer particles which contain a thin film of catalyst solution or in the interiors of such particles to the extent catalyst solution is able to permeate into such particles.

Additional adjuvants and additives may be used in the polymerization in order to obtain enhanced polymerization results or polymer properties. Examples of such adjuvants include organoaluminum compounds containing a bulky hydrocarbyloxy group, especially a di(hydrocarbyl) (hydrocarbyloxy)aluminum compound having from 1 to 20 carbons in each hydrocarbyl or hydrocarbyloxy group, and hydrocarbylsilane or dihydrocarbylsilane compounds, or mixtures thereof. Preferred silane adjuvants are arylsilanes, substituted arylsilanes, diarylsilanes, substituted diarylsilanes, alkylsilanes and dialkylsilanes. Most preferred silane adjuvants used herein include diphenylsilane, phenylsilane, octylsilane, butylsilane and mesitylsilane which due to the fact that they are liquids are readily measured and handled in the polymerization process. Suitable di(hydrocarbyl)(hydrocarbyloxy)aluminum compounds correspond to the formula $T^1_2AlOT^2$ wherein $T^1$ is $C_{3-6}$ secondary or tertiary alkyl, most preferably isopropyl, isobutyl or tert-butyl; and $T^2$ is a $C_{12-30}$ alkaryl radical or aralkyl radical, most preferably, 2,6-di(t-butyl)4-methylphenyl, 2,6-di(t-butyl)-4-methyltolyl, 2,6-di(i-butyl)-4-methylphenyl, 4-(3',5'-ditertiarybutyltolyl)-2,6-ditertiarybutylphenyl, or triphenylmethyl.

The skilled artisan will appreciate that the invention disclosed herein may be practiced in the absence of any component which has not been specifically disclosed. The following examples are provided as further illustration thereof and are not to be construed as limiting. Unless stated to the contrary all parts and percentages are expressed on a weight basis.

EXAMPLES

Examples 1–2 and Comparative A

All reactions and manipulations were carried out under inert atmosphere. The reagents, ethylbenzene, styrene, and p-methylstyrene were purified by sparging with $N_2$ and passing through activated alumina and handled using standard inert atmosphere techniques. Catalyst solutions were prepared using ethylbenzene and the required amounts of a 1.5M toluene solution of methylalumoxane (MAO), triisobutylaluminum (TIBA) and octahydrofluorenylltitaniumtrimethoxide. The molar ratio of MAO:TIBA:Ti used was 75:25:1 with a final concentration of the catalyst solution, based on titanium, of 0.007 M.

Polymerizations were carried out in a continuous, powder bed reactor, operating under solid state polymerization conditions of about 80 percent solids content and 80° C. polymerization temperature under an inert atmosphere. Styrene monomer was deoxygenated by sparging with nitrogen and passing through activated alumina then hydrogenated to remove unsaturated contaminants. Hydrogen, if used, was introduced into the reactor from a hydrogen gas manifold of known pressure. The polymerization was initiated by addition of the desired amount of catalyst solution described above. The mole ratio of styrene to titanium was maintained at the desired ratio until equilibrium conditions were obtained in the reactor. Polymer product was continuously removed from the reactor and contacted with steam to terminate the catalyst, dried in a rotary dryer, and pelletized in a twin screw extruder. All polymers had syndiotacticities of greater than 95 percent based on a racemic triad. Polymerization and recovery conditions are listed in Table 1.

TABLE 1

| Ex. | Temp. (° C.) | MAO/ TIBA/ $Ti^1$ | Styrene/ $Ti^1$ | Solids (percent) | $H_2$/ $Ti^1$ | Drying Temp. (° C.) | Extrusion Temp. (° C.) |
|---|---|---|---|---|---|---|---|
| A* | 83 | 75/25/1 | 63,600 | 77 | 0 | 210 | 295 |
| 1 | 78 | " | 87,500 | 79 | 21 | 211 | 310 |
| 2 | 82 | " | 87,500 | 82 | 105 | 209 | 295 |

*Comparative, not an example of the invention
[1]Molar ratio. At the concentrations and experimental conditions used, a molar ratio of 21 is equivalent to a hydrogen partial pressure of 0.17 kPa. A molar ratio of 105 is equivalent to a hydrogen partial pressure of 0.87 kPa.

Polymer properties were tested and are reported in Table 2. Tensile modulus, strength and elongation values were determined according to ISO 527.

TABLE 2

| Ex. | Tc (° C.) | Mw | Mw/Mn | Modulus (MPa) | Strength (MPa) | Elongation (percent) |
|---|---|---|---|---|---|---|
| A* | 271 | 191,000 | 2.01 | 3,660 | 55.7 | 1.7 |
| 1 | 269 | 198,000 | 2.57 | 3,610 | 52.6 | 1.6 |
| 2 | 270 | 200,000 | 3.33 | 3,660 | 54.1 | 1.6 |

*comparative, not an example of the invention

The flow characteristics of the polymers were measured using a rotary rheometer at a temperature of 290° C. under nitrogen atmosphere. Reduced viscosity ($\eta^*/\eta_0$) was determined as the ratio of the viscosity of the polymer melt ($\eta^*$) and the viscosity of the polymer melt at zero shear rate ($\eta_0$). Percent improvement in flowability was determined according to the formula: $\{[\eta^*/\eta_0]_1-[\eta^*/\eta_0]\}\cdot 100/[\eta^*/\eta_0]_1$. Results are shown in Table 3.

TABLE 3

| Ex. | ω (rad/s) | $\eta^*$ (Pa · s) | $\eta_0$ (Pa · s) | $\eta^*/\eta_0$ | Flowability Improvement (percent) |
|---|---|---|---|---|---|
| Aa* | 31.47 | 454.6 | 595.5 | 0.7634 | 0 |
| Ab* | 79.06 | 359.3 | " | 0.6034 | 0 |
| Ac* | 198.6 | 254.1 | " | 0.4268 | 0 |
| 1a | 31.47 | 414.3 | 569.7 | 0.7272 | 4.74 |
| 1b | 79.06 | 321.4 | " | 0.5641 | 6.51 |
| 1c | 198.6 | 224.9 | " | 0.3948 | 7.50 |
| 2a | 31.47 | 375.1 | 531.3 | 0.7060 | 9.08 |
| 2b | 79.06 | 286.4 | " | 0.5390 | 10.7 |
| 2c | 198.6 | 198.0 | " | 0.3727 | 12.7 |

*comparative, not an example of the invention

As may be seen by examination of the foregoing results, the compositions prepared according to the invention possess improved flowability compared to polymers prepared according to the prior art.

What is claimed is:

1. A process for preparing syndiotactic polymers of vinylaromatic monomers comprising contacting one or more vinylaromatic monomers and one or more catalyst compositions comprising a titanium coordination complex capable of preparing syndiotactic vinylaromatic polymers under addition polymerization conditions characterized in that the polymerization is conducted in the presence of hydrogen gas at a partial pressure from 0.1 kPa to less than 10 kPa, and at a molar ratio based on Ti from 10–500.

2. A process according to claim 1 wherein the vinylaromatic monomer is styrene, p-methylstyrene or a mixture thereof.

3. A process according to claim 1 wherein the catalyst composition comprises:

1) at least one titanium coordination complex corresponding to the formula: $CpTiX_nX'_q$, wherein:

Cp is an aromatic polyatomic group coordinated to Ti by means of delocalized $\pi$-electrons;

X independently each occurrence is a monovalent anionic moiety having up to 20 atoms not counting hydrogen; alternatively, two X groups together may form a divalent, dianionic moiety having both valences bound to Ti, or form a neutral diene bonded to Ti by delocalization of the diene bonds; or further alternatively, one or more X groups may be bonded to one or more X' groups thereby forming a moiety that is both covalently bonded to M and coordinated thereto by means of Lewis base functionality;

X' independently each occurrence is a neutral Lewis base ligating compound having up to 20 atoms not counting hydrogen;

n is an integer from 1 to 3 equal to one less than the oxidation state of Ti; and q is 0, 1 or 2; and 2) an activating cocatalyst, the molar ratio of 1) to 2) being from 1:10,000 to 100:1.

4. A process according to claim 3 wherein the catalyst composition comprises octahydrofluorenyltitaniumtrimethoxide, triisobutylaluminum, and methylalumoxane.

5. A syndiotactic vinylaromatic polymer having Mw from 10,000 to 2,000,000, Mw/Mn from 2.0 to 10.0, and a flowability improvement measured by a rotary rheometer at 290° C. and a frequency of 50 radians/sec., of at least 4.0 percent.

6. Syndiotactic polystyrene according to claim 5.

* * * * *